UNITED STATES PATENT OFFICE.

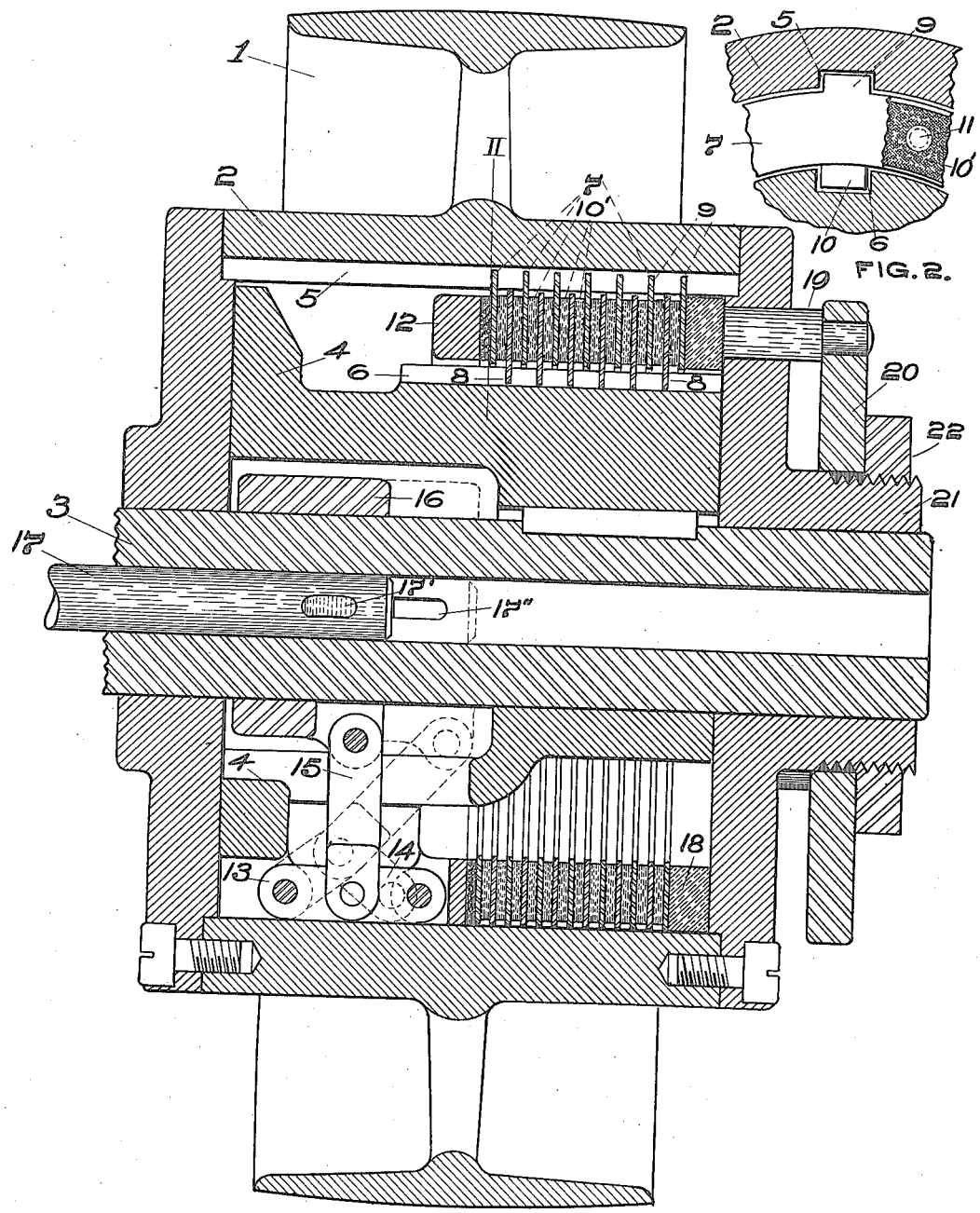

FREDERICK F. CLARKE, OF FRANKLIN, PENNSYLVANIA, ASSIGNOR TO COLBURN MACHINE TOOL COMPANY, OF FRANKLIN, PENNSYLVANIA, A CORPORATION OF PENNSYLVANIA.

MULTIPLE-DISK CLUTCH.

1,188,041. Specification of Letters Patent. Patented June 20, 1916.

Application filed December 3, 1914, Serial No. 875,332. Renewed May 10, 1916. Serial No. 96,710.

*To all whom it may concern:*

Be it known that I, FREDERICK F. CLARKE, citizen of the United States, residing at Franklin, in the county of Venango and State of Pennsylvania, have invented certain new and useful Improvements in Multiple-Disk Clutches, of which the following is a specification.

The object, construction and operation of this invention are herein set forth with sufficient clearness to enable those skilled in the art to which it relates, to make and use the same.

The object of my invention is to provide a compact, efficient, multiple-disk clutch-pulley, adapted especially for use on machine-tools, having all its operating mechanism contained and inclosed within the hub of the pulley, where it is protected from dust and injury.

A further object is to eliminate projecting parts usually found in clutches of this type, and which are a source of more or less danger to operatives.

The construction whereby I attain these objects, is clearly illustrated in the drawings which form a part hereof in which:—

Figure 1 is a central diametral section of the pulley and its hub. Fig. 2 is a fragmentary view showing a transverse section on line II of Fig. 1.

As here shown, my device consists of a pulley 1, adapted to be driven by a belt, and having an enlarged hub 2, which is revolubly mounted upon a shaft 3, that is to be driven. Upon said shaft, within said hub is keyed a spider 4. The inner wall of said hub is provided with a plurality of grooves or seats 5, and the periphery of the hub of said spider is likewise provided with a plurality of similar grooves 6, which grooves 5 and 6 extend longitudinally of the respective element in which they are formed, and preferably parallel with each other. Between the wall of said hub 2 and the periphery of the hub of said spider, is formed an annular space in which are placed a plurality of annuli or disks 7 and 8: Each of the disks 7 is provided upon its periphery with integral keys 9, corresponding in number and position to the number and position of grooves or seats 5; these are termed the drive disks. Each of the disks 8 is provided with integral, inwardly-projecting keys 10, corresponding in number and position, to the number and position of the seats 6; the last-mentioned disks being the driven disks. Between said disks 7 and 8 is located a friction material 10', which is preferably secured to one of the adjacent disks by means of suitable rivets, 11; said disks 7 and 8 are normally independent, each group being disconnected from the other.

Power may be transmitted to pulley 1 from any suitable source, and the clutch mechanism here shown is for the purpose of transmitting said power from pulley 1 to shaft 3 by the frictional engagement of disks 7 with disks 8, or to cause the discontinuance of such transmissive action.

For the purpose of causing the inter-engagement of the disks 7 with the disks 8, and the transmission above stated, I provide a compression ring 12 which is adapted to bear against the adjacent disk 7, and the compression and transmissive inter-engagement of said disks 7 and 8 is caused by toggle-links 13 and 14, which are actuated by the arm 15, one end of which is attached to said links, and the other end thereof to the collar 16, which is mounted upon the shaft 3, and is movable longitudinally thereon by means of the rod 17 which is located inside said shaft, the same being hollow for the reception of said rod, and is provided with a slot 17'' through which the gib 17' extends and engages said collar 16. Link 13 is attached at its other end to the spider 4.

In Fig. 1 the mechanism is shown, by the full lines, in the operative position, that is, ring 12 is in the compression position, causing the inter-engagement of the disks 7 and 8, which causes the whole mechanism to turn with the pulley as a unitary structure, and drives the shaft 3. When a release of the clutch is desired, collar 16 is moved to the position shown in dotted lines in Fig. 1 which withdraws ring 12 from its compression position against said disks whereupon disks 7 are free to move between disks 8 and no motion is then transmitted to the spider 4 or shaft 3 to which said spider is keyed.

In order that the proper degree of frictional or transmissive pressure may be secured between disks 7 and 8, also to provide for taking up wear between the same, adjustment is provided for in the following manner: Against the outermost disk 7 is placed an adjusting ring 18. A plurality of pins 19 pass through the adjacent wall of the hub 2, and the inner end of each of said pins bears against said ring 18. The outer end of each of said pins is secured to a plate 20, which is mounted upon a hub or boss 21, that is formed integrally with hub 2. Said boss projects through the center of said plate 20, and the outer end of said boss is externally screw-threaded. A nut 22 is screwed upon said thread with its inner face bearing against the adjacent face of said plate 20, and by this means, pins 19 may be caused to move inwardly, thereby adjusting ring 18 inwardly any desired amount, for the purpose above stated, and by this provision the clutch may be adjusted to transmit the desired amount of power, and its efficiency be thereby easily and properly maintained.

Any suitable device may be employed to actuate rod 17 longitudinally, the particular means which I have thus far employed being shown in my co-pending application for a patent for improvements in speed gearing for boring mills, Serial Number 875,329 filed at even date herewith.

Applicant is aware that disks substantially such as are here shown have heretofore been employed in clutches, and considering same as separate elements, does not claim the same as new; but the embodiment of the same within the hub of a pulley, in combination with the other elements as shown, for operably inter-engaging said disks, and for obtaining and maintaining the proper operative adjustment thereof, applicant believes to be new.

I claim:—

1. In a multiple-disk clutch-pulley, in combination, a pulley adapted to be power driven and provided with an enlarged hub, there being a chamber within said hub, a shaft extending revolubly through said hub and chamber, a spider positioned within said chamber and rigidly secured to said shaft, there being also a collar-chamber within one end of said spider, a plurality of frictional annuli positioned within said hub chamber and surrounding one end of said spider, each alternate annulus being operably engaged by said hub, and each intermediate annulus being operably engaged by said spider, said alternate and said intermediate annuli being normally free from each other, or interengagement; a rigid bearing for the outermost-positioned annulus, a compression ring arranged in contact with the innermost-positioned annulus, a toggle connected at one end to said compression-ring and at the other end to said spider, a longitudinally-movable collar mounted upon said shaft and positioned within said collar chamber, arms pivotally connected at one end to said collar and at their other end to the intermediate joint of said toggle, and means operable to move said collar longitudinally of said shaft for the purpose of actuating said annuli into operable frictional engagement, as and for the purpose set forth.

2. In a multiple-disk clutch-pulley, in combination, a pulley adapted to be power driven and provided with an enlarged hub, there being a chamber within said hub, a shaft extending revolubly through said hub and chamber, a spider positioned within said chamber and rigidly secured to said shaft, there being also, a collar-chamber within one end of said spider, a plurality of frictional annuli positioned within said hub-chamber and surrounding one end of said spider, each alternate annulus being engaged by said hub and each intermediate annulus operably engaging said spider, said alternate and said intermediate annuli being normally free from each other, a rigid bearing for the outermost-positioned annulus, means operable to adjust said bearing inwardly, a compression-ring arranged in contact with the innermost-positioned annulus, toggles connected at one end to said compression ring and at the other end to said spider, a longitudinally-movable collar mounted upon said shaft and positioned within said collar-chamber, arms pivotally connected at one end to said collar and at their other end to the intermediate joint of said toggle, and means operable to move said collar longitudinally of said shaft for the purpose of actuating said annuli into operable frictional interengagement, as and for the purpose set forth.

3. In a multiple-disk clutch-pulley, in combination, a pulley adapted to be power driven and provided with an enlarged hub, there being a chamber within said hub, a hollow shaft extending revolubly through said hub and said chamber, a spider positioned within said chamber and rigidly secured to said shaft, there being a collar-chamber within one end of said spider, a plurality of frictional annuli positioned within said hub-chamber and surrounding one end of said spider, each alternate annulus being operably engaged by said hub, each intermediate annulus being in operable engagement with said spider, said alternate annuli and said intermediate annuli being normally free from each other, a rigid bearing for the outer-most positioned annulus means adapted to adjust said bearing inwardly, a compression-ring arranged in coning for the outermost-positioned annulus, toggles connected at one end to said compression ring and at the other end to said spider, a longitudinally-movable collar mounted upon said shaft and positioned within said collar-chamber, arms pivotally connected at one end to said collar and at their other end to the intermediate joint of said toggle, a longitudinally movable rod positioned within said hollow shaft, and engaging said collar and operable to move same longitudinally of said shaft for the purpose of actuating said compression ring, whereby the operable, interengagement of said annuli is caused, for the purpose set forth.

In testimony whereof I affix my signature in presence of two witnesses.

FREDERICK F. CLARKE.

Witnesses:
    MARY B. ECKERT,
    RAY S. CLARKE.